(12) United States Patent
Tidwell et al.

(10) Patent No.: US 8,160,452 B1
(45) Date of Patent: Apr. 17, 2012

(54) RAPID ACQUISITION, POINTING AND TRACKING OPTICAL SYSTEM FOR FREE SPACE OPTICAL COMMUNICATIONS

(75) Inventors: Terry L. Tidwell, Fayetteville, AR (US); Jeffrey T. Gregory, Mountainburg, AR (US); Charles Henry Chalfant, III, Fayetteville, AR (US); Fred J. Orlando, West Melbourne, FL (US); Matthew Leftwich, Fayetteville, AR (US)

(73) Assignee: Space Photonics, Inc., Fayetteville, AR (US)

( * ) Notice: Subject to any disclaimer, the term of this patent is extended or adjusted under 35 U.S.C. 154(b) by 610 days.

(21) Appl. No.: 12/349,570

(22) Filed: Jan. 7, 2009

Related U.S. Application Data

(60) Provisional application No. 61/010,275, filed on Jan. 7, 2008.

(51) Int. Cl.
*H04B 10/00* (2006.01)

(52) U.S. Cl. ........ 398/140; 398/138; 398/139; 398/142; 398/156

(58) Field of Classification Search .......... 398/138–140, 398/142
See application file for complete search history.

(56) References Cited

U.S. PATENT DOCUMENTS

| | | | |
|---|---|---|---|
| 5,062,150 A | 10/1991 | Swanson et al. | |
| 5,218,467 A | 6/1993 | Ross et al. | |
| 6,137,103 A | 10/2000 | Giles et al. | |
| 6,215,118 B1 | 4/2001 | Heffner et al. | |
| 6,285,481 B1 | 9/2001 | Palmer | |
| 6,327,063 B1 | 12/2001 | Rockwell | |
| 6,347,001 B1 | 2/2002 | Arnold et al. | |
| 6,556,324 B1 | 4/2003 | Meier | |
| 6,557,421 B2 | 5/2003 | Garde et al. | |
| 6,577,421 B1 | 6/2003 | Cheng et al. | |
| 6,628,882 B2 | 9/2003 | Vaganov et al. | |
| 6,731,878 B1 | 5/2004 | Britz et al. | |
| 6,738,539 B2 | 5/2004 | Hagood et al. | |
| 6,806,882 B2 | 10/2004 | Kanda | |
| 6,806,992 B2 | 10/2004 | Soneda et al. | |
| 6,935,042 B2 | 8/2005 | Bonham et al. | |
| 6,944,403 B2 * | 9/2005 | Margalit et al. | 398/129 |
| 7,082,232 B2 | 7/2006 | Bona et al. | |
| 7,224,508 B2 | 5/2007 | Chalfant, III et al. | |
| 7,612,317 B2 | 11/2009 | Chalfant, III et al. | |
| 7,612,329 B2 * | 11/2009 | Chalfant et al. | 250/234 |
| 2002/0081060 A1 * | 6/2002 | Margalit et al. | 385/18 |
| 2002/0102059 A1 | 8/2002 | Cho et al. | |
| 2003/0202236 A1 | 10/2003 | Khoshnevisan et al. | |
| 2005/0253055 A1 | 11/2005 | Sprague et al. | |

FOREIGN PATENT DOCUMENTS

| | | |
|---|---|---|
| EP | 0482472 A2 | 4/1992 |
| EP | 0504022 A1 | 9/1992 |
| EP | 0482472 B1 | 5/1995 |

\* cited by examiner

*Primary Examiner* — Dung Nguyen

(74) *Attorney, Agent, or Firm* — J. Charles Dougherty

(57) ABSTRACT

An acquisition, pointing and tracking system for free space optical communications systems performs the pointing and tracking function internally by way of translating an internal optical fiber in the focal plane of the transceiver telescope with a reflecting mirror in the telescope focal plane of each linked transceiver. The beam reflected from the mirror records the exact direction of the reflected beam at the transmitting beam's transceiver terminal, providing the transmitting source to lock on to the receiving telescope, allowing for the link to be acquired.

12 Claims, 3 Drawing Sheets

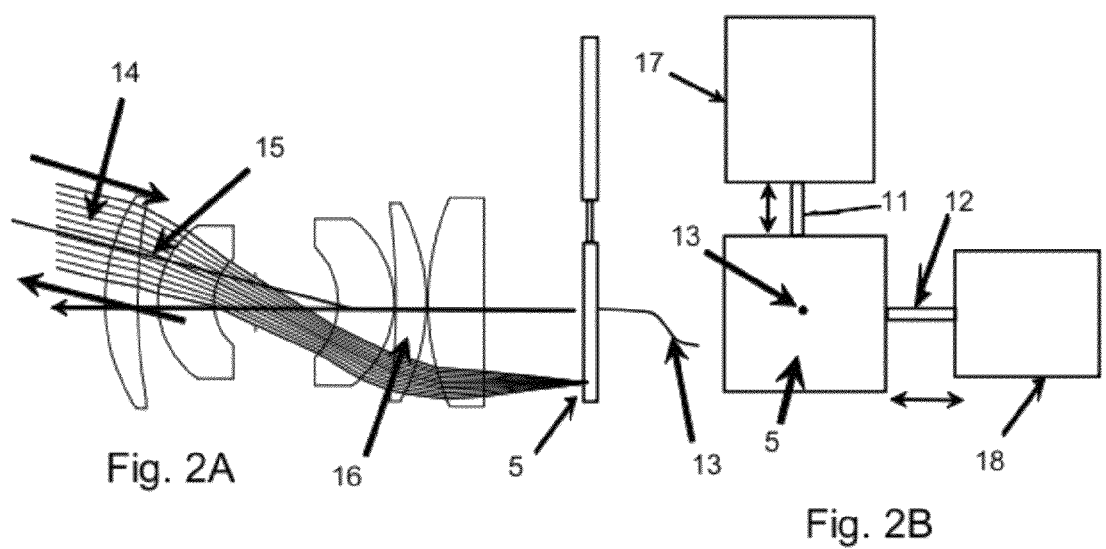

RAPID ACQUISITION, POINTING AND TRACKING OPTICAL SYSTEM FOR FREE SPACE OPTICAL COMMUNICATIONS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contract no. F29601-02-C-0021 awarded by the United States Air Force Research Laboratory.

BACKGROUND OF THE INVENTION

The present invention relates to the field of optical tracking, and in particular to the field of laser target acquisition and tracking. More particularly, in various embodiments the present invention relates to a beam pointing and tracking apparatus and method for laser target acquisition and tracking using translational stages that move an optical fiber in the focal plane of the transmitting and receiving optical system while surrounded by a reflecting mirror in the focal plane that also moves in conjunction with the optical fiber.

Laser targeting and tracking systems are today employed in a vast array of military and civil applications. A laser targeting and tracking system generally consists of a transmitting terminal and a receiving terminal. A transmitting terminal transmits an optical signal generated by a source that converts electrical signals to optical signals for transmission out of the transmitting telescope. The receiving terminal receives the laser illuminated target "signature" signal (back reflection) into a receiving telescope, which focuses the optical signal into an optical photodetector, and then converts the light energy into an electrical signal.

Pointing the beam that exits an optical transmitter is typically carried out via a motorized beam-steering gimbal or mirror system that guides the laser beam through the telescope to the target. As with the transmitting telescope, the receiving telescope also uses scanning mirrors supported by gimbals to acquire and track the incoming optical signature. Gimbals are used to steer the mirrors in this sort of system. A gimbal is a mechanical apparatus to allow a suspended object to rotate freely along two orthogonal axes simultaneously, within a defined angle of view. Gimbals are well known in the art, having been used, for example, since at least as early as the sixteenth century in the suspension of maritime compasses. Accurate alignment of the laser targeting system is essential for free space laser target tracking systems. Thus such systems must provide accurate alignment and high angular resolution in order for the receiver telescope to efficiently collect the incoming optical beam. Conversely, the transmitter telescope must be able to accurately point its beam so that a remotely-reflecting object can efficiently reflect the optical signal for the receiver photodetector.

In addition to the gimbal-based systems described above, beam steering in optical systems may also be accomplished by other means. In particular, some existing non-gimbaled beam-steering solutions include acousto-optics, liquid crystals, electro-optics, micro-optics, galvanometer or magnetic mirrors, and micro-mirror arrays. These types of systems, however, have generally proven to be unwieldy, or lack the speed, precision, and reliability necessary for high-speed, long-distance laser target tracking. Thus the most common means for beam steering in optical communications systems remains by the use of a motorized gimballing system. A gimballing system used for the alignment of an optical transmitter or receiver typically moves the entire transmitting or receiving telescope through the required field of view.

Accurate alignment of the transceiver system is essential for laser target tracking systems. Therefore, gimballing systems must provide accurate alignment angular resolution in order for the receiver telescope to efficiently collect the incoming optical beam. Conversely, the transmitter telescope must be able to accurately point its beam so that a remote-receiving terminal can efficiently collect the optical signal for the photodetector. Mechanical gimballing systems have been favored in many laser tracking systems because they can provide very fast alignment times coupled with high angular resolution.

Gimballed beam-steering systems do, however, suffer from several important disadvantages. Such systems are quite heavy due to the weight of the mechanical components, motors, and servos necessary for such a system. While weight may not be as important a factor in the design of a land-based system, weight is of paramount importance in aircraft design, which is a critically important application for laser tracking systems. Gimballing systems are also quite bulky due to the required mechanical components, which is also a significant disadvantage in the design of airborne systems. Finally, mechanical gimballing systems require the use of a great deal of electrical power, far more power than is typically consumed by the electronics associated with an optical receiver or transmitter system. Again, while power consumption may not be as important a factor in permanent ground-based systems, it is a critically important factor in airborne systems, as well as in mobile ground-based systems such as may be mounted on land vehicles.

In order for an optical receiver to begin receiving a signal from a transmitter, the incoming search signal must first be located and the receiver pointed in the direction of the incoming signal. During the initial search for a signal, or if the signal is lost for some reason and reacquisition is thus necessary, a search pattern is generated by an algorithm stored in the receiver control system. The search pattern crosses the focal plane of the receiver or a specified sub-area, called the Uncertainty Area (UA), employing the motion control stage. This pattern may be raster, spiral, spoked, lissajous, rose, etc. as are known in the art. Each pattern has its own advantages and disadvantages. For example, the rectangular spiral pattern suffers a sacrifice in search loop-time as opposed to some contoured patterns, but has the advantage of a gain in redundancy by using a sequential motion system. That is, both the search pattern and tracking involve only one axis in motion at a given time, allowing (by use of a simple MUX circuit) each servo amplifier in a typical control system to be a backup for the others. Studies indicate that rose and lissajous search patterns are the most efficient in finding a satellite communication beam. Search time using these search patterns may be reduced by as much as half that required for a basic raster pattern. This is due to the fact that motor reversals (and associated velocity profiles, striction, etc.) are minimized, allowing more "ground" to be covered in a given time period. Using another example, an outward spiral search pattern is desirable if an acquired signal is suddenly lost, because it weights the search in the last known area of the beam.

In order for a search to be successful using the currently employed gimbal-based laser communications systems, the target terminal must be aligned with the scanning terminal to within its (instantaneous) field of view (FOV) to "see" the scanning terminal when it is swept by the scanning terminal's beacon. This means that a scan-stairstep-scan approach must be used whereby the scanning terminal sweeps its entire UA and, if detection is not made, the terminal then moves a small amount and waits for the scanning terminal to sweep its UA again. This process must be repeated until the terminal happens to have the scanning terminal within its FOV. This is a very inefficient process, sometimes requiring hours for acquisition. For example, looking at a purely statistical acquisition process for a typical GEO-GEO UA (say +/−2 degree UA) will result in a motion plane search of approximately 2 mm×2 mm. If one assumes a 60,000 km separation between terminals—as is common for satellite communications—and calculates the distance traveled in the motion plane per "flash-time" (i.e., time that the transmitted beam is incident on the receiver optics during its sweep) and call this a "step," and then calculate an increment to move over per pass of the search pattern and still detect the target's beam, one can estimate how many loops (i.e., iterations of the search pattern) are needed for acquisition. With a typical laser communications system, a hypothetical 8 µm step and 10 µm increment is not unusual. This example would then generate approximately 50,000 discrete "points" that are the size of the effective FOV (instantaneous FOV plus the area that the FOV could be moved through during flash time) where the receiver could be positioned when the incoming beam sweeps its optics. If the search pattern contains no overlap, the odds are 50000:1 that an acquisition will occur during a given loop-time if no other information is known. At 1 ms per point, the loop-time taken would be 50 s and the required average traverse speed (feed rate) in the motion plane is 80 mm/s. This situation obviously would lead to long acquisition times and the need for complex acquisition processes to statistically "rule out" sections of the UA. It may be noted that feed rate is limited by the minimum flash time needed at the target to acquire the needed data. Data may be taken at higher speed by using faster detectors and high-speed analog-to-digital (A-to-D) converters. However, this can have detrimental affects to tracking performance.

Another problem is presented by attempting acquisition between terminals that are very far apart and/or are moving very fast relative to each other The additional challenges in this situation are due to the fact that the fast-moving beam requires high bandwidth signal sampling, and that transmitter jitter cannot be compensated before the link is established without the use of inertial sensors. Because of these issues, even the scenario described in the examples above may not work deterministically. The fact that the scanning motion must be very fast means that once a terminal detects its target's beam (sees a "flash"), it does not necessarily mean that its targeted terminal detected it simultaneously (due to differences in noise background, detector/processor latencies, etc), or that either could stop in time to lock-on before going off the other's FOV. Hence the best the scanning terminals can do is reduce their UA based on location of the flash. Also, because jitter cannot be compensated for before link acquisition, it is possible that the transmitter can miss the receiver optics at the time that acquisition should have occurred (without the jitter). Thus the entire process would have to be repeated. For applications in which Line of Sight (LOS) is always maintained, this issue may not present a serious problem. For missions in which LOS comes and goes, such as is common with orbiting satellites, this issue presents significant challenges.

It may be seen that if the UA can be reduced to an amount such that each terminal's beacon remains on the other terminal's optics throughout that terminal's search pattern, the terminals should acquire each other within one "loop-time." Thus much effort has been expended to find ways to reduce the UA to this size. One technique for this is to widen ("spoil") the beam as much as possible by using specially designed optics and/or reducing the focal length (i.e., using the Z axis of the motion control stage of typical fiber-optic based satellite communications systems to move the fiber closer to the telescope) during the search, and then reposition to the focal plane after acquisition. Widening the beam will make it more likely to fall on the optics of the other terminal, although this reduces the optical intensity. For acquisition, however, the intensity of the signal above the detection threshold is not consequential, since the receiver simply needs to be able to detect the signal, not read data error-free. Thus, it is most efficient to widen the beam to the limit that provides detectable intensity (which is a function of link distance and laser power) at the target terminal. For long distance links, this fall-off in intensity generally requires such a powerful laser that a separate system (laser and optics) is used for the search beacon from that of the communications system. This requires very large, expensive, and power-hungry systems.

What is desired then is a laser tracking system that provides high speed and high angular resolution, with reduced size, weight, and power consumption, and provides for rapid acquisition as compared to traditional gimballing systems now employed in such devices. These desires and met and the problems of the prior art are solved in the present invention, as described following.

BRIEF SUMMARY OF THE INVENTION

The present invention is directed to a laser tracking apparatus and method that provides angular adjustment by means of the movement of an optical fiber/mirror assembly residing in the focal plane of the transmitting or receiving telescope. The mirror allows a received beam to be reflected back through the telescope and expanded exactly reciprocally from its arriving direction, thereby identifying the location of the receiver. This greatly simplifies the search process by effectively reducing the UA of the incoming signal. The transmitting source receives the returned beam through its telescope and into its receiving optical fiber, and records its direction, allowing for the rapid acquisition of the link. Owing to this novel structure, the present invention achieves very fast response times while carrying out angular pointing and tracking. Because the present invention requires only the movement of an optical fiber/mirror assembly, it requires the consumption of far less power than the heavy mechanical systems that rely upon gimbals. It also allows a transmitter or receiver system to be constructed that is of much smaller size and weight compared to gimbaled systems. Because the complex mechanical components of gimballing systems are not required, the overall cost of the transmitter or receiver system is significantly reduced.

It is therefore an object of the present invention to provide for a laser tracking apparatus and method that achieves high speed and angular precision and achieves rapid target terminal acquisition without the use of gimbals.

It is a further object of the present invention to provide for a laser tracking apparatus and method that consumes relatively little electrical power during operation.

It is also an object of the present invention is to provide for a laser tracking apparatus and method that is of a relatively small size and weight.

It is also an object of the present invention is to provide for a laser tracking apparatus and method that has a relatively low production cost.

These and other features, objects and advantages of the present invention will become better understood from a consideration of the following detailed description of the preferred embodiments and appended claims, in conjunction with the drawings as described following:

BRIEF DESCRIPTION OF THE DRAWINGS

FIG. 2A is a diagram illustrating in side elevational view the operation of the preferred embodiment of the present invention in the case in which a beam enters the optical system and focuses on a spot at the bottom of the mirror, away from the optical fiber connected to the detection system.

FIG. 2B is a diagram illustrating in rear elevational view the preferred embodiment of the present invention in the same configuration as shown in FIG. 2A

DETAILED DESCRIPTION OF THE INVENTION

Figures 1A, 1B:
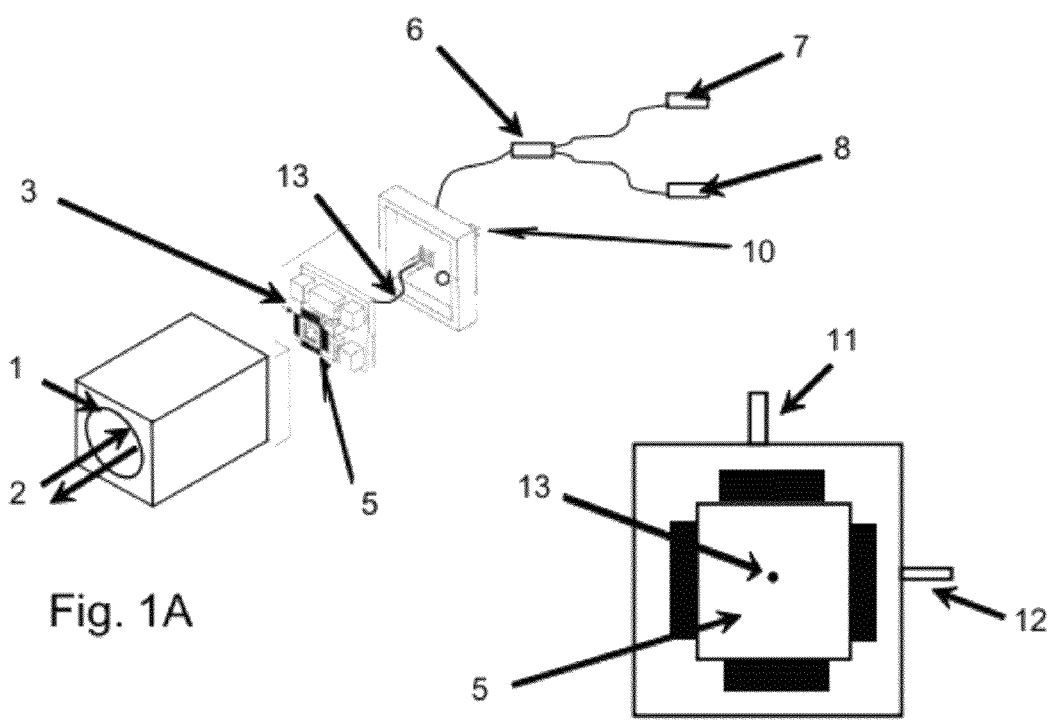
FIG. 1A is an exploded perspective view of a preferred embodiment of the present invention.
FIG. 1B is a detail plan view of the mirror and optical fiber of a preferred embodiment of the present invention as shown in FIG. 1A.

With reference to FIGS. 1A and 1B, the preferred embodiment of the present invention may now be described. The preferred embodiment is a laser communications transceiver incorporating the rapid acquisition, tracking and pointing system described herein, but the invention is not so limited, and in fact may be put to many other logical applications as will be apparent to those skilled in the art. The preferred embodiment includes an optical system consisting of beam expansion optics and focusing optical design that provides the reciprocal direction reflection of an incoming beam as described herein.

Now turning to a description of the particular elements of the preferred embodiment of the present invention, as shown in FIGS. 1A and 1B, the device incorporates an optical fiber 13, as are well known in the art. Any other means by which light may be transmitted along a path could be employed in alternative embodiments in place of optical fiber 13. The purpose of optical fiber 13 is to receive and transmit optical signals, which will be converted to or from electrical signals within the device. Optical fiber 13 is preferably coiled, as shown in FIG. 1A, the purpose of which will be made clear in the description provided below.

Optical fiber 13 is connected to control assembly 3. Control assembly 3 also includes mirror 5, as shown in FIG. 1B, as well as Y-axis translation apparatus 11 and X-axis translation apparatus 12. Translation apparatuses 11 and 12 may preferably be formed of motors, actuator arms, and linkages to provide translation of mirror 5. For example, actuators such as disclosed in U.S. Pat. No. 7,224,508, which is incorporated herein by reference, may be employed, or other actuator systems as are known in the art. It may be seen from FIG. 1B that optical fiber 13 preferably passes through mirror 5 perpendicularly. Mirror 5 may be moved in the X and Y directions by means of X-axis translation apparatus 12 and Y-axis translation apparatus 11, respectively, the purpose of which will become clear from the explanation below.

Mirror 5 lies in the focal plane of transmit and receive telescope 1, such telescopes being known in the art. The purpose of telescope 1 is to receive and transmit optical signals 2. A mounting assembly (not shown) may optionally be employed to provide a connection point between mirror 5, optical fiber 13, Y-axis translation apparatus 11, and X-axis translation apparatus 12. Power connector 10 provides power from the device to control assembly 3. Fiber optic splitter/coupler 6 is preferably employed to provide an optical signal from/to optical fiber 13 between optical/laser transmitter 7 and optical/laser receiver 8. Optical transmitters and receivers of the type employed in the preferred embodiment are well known in the art.

The focal plane of telescope 1 may be of any size, but in the preferred embodiment the focal plane may vary from as small as a few square millimeters up to many square centimeters. This depends entirely on the application and the required field of regard for the device. The preferred embodiment is operable to generate and send a laser signal into the optical transmitter 7, through the fiber optic coupler (or circulator) 6, and transmitted out of the optical fiber 13 in the focal plane of the telescope. The direction of the exit beam is determined by the optical system and the X-Y position of optical fiber 13 in the focal plane. Conversely, an incoming beam is focused at a specific spot in the focal plane depending on its arriving angle. The invention, in the preferred embodiment, contains the various transmit, receive, acquisition, and tracking control electronics necessary for operation of the transceiver function, which preferably are contained in a remote electronics bay (not shown). These electronic components provide control of the required azimuth and elevation range of motion and tracking slew rate translation devices to track and point the incoming and outgoing optical beams. Such algorithms and controls to implement the algorithms are well known in the art.

The preferred embodiment utilizes a single telescope 1, with optical noise isolation being accomplished by a high quality optical coupler 6 with low reflections, or alternatively an optical circulator that provides low feedback. As with most free space optical transceiver systems, the preferred embodiment is equipped with optical filters (not shown) in order to filter out optical noise, as are known in the art. It may be noted that any selected communications band in any of the optical domains may be utilized; however, in the preferred embodiment optical filtering is utilized, providing narrow-band optical intensity, and thereby providing low noise signal detection.

FIGS. 2A and 2B illustrate the operation of a preferred embodiment of the present invention with the incoming received beam 14 in a first example configuration. The configuration shows the angular direction of the beams with respect to the relative position of the transceiver telescope 1, which includes lenses 16 for the purpose of focusing incoming received beam 14 at the focal plane of the device. The received beam 14 arrives from a remote transmitter or target (not shown), which preferably is identical to the preferred embodiment as illustrated herein but may be any other form of optical transmitter in alternative embodiments. The received beam 14 arrives in an expanded form, such that only a portion of received signal is actually captured by receiver telescope 1 and focused on the receiver focal plane at mirror 5 through receiver lens system 16. The received beam angle of arrival determines the location of the focused spot on mirror 5 at receiver focal plane on control assembly 3, as shown. In this case, the focused spot is below the center of the focal plane because the received beam 14 arrived at an angle inclined above the perpendicular line of sight of telescope 1. This position will be designated herein as Y=N and X=M. Mirror 5 provides a return signal in the precisely opposite direction of incoming signal 14, regardless of where in mirror 5 the focused spot is presented. A return beam, traveling in the opposite direction as received beam 14, is sent back to the transmitting source, identifying the location of the receiver. The transmitting source then receives the returned beam through its telescope and into its receiving optical fiber, which preferably is constructed in the same manner as the preferred embodiment described herein, and records this direction, thereby allowing for the rapid acquisition of the link. It may be seen that by the employment of mirror 5 in the focal plane of the device, rapid signal acquisition and tracking is achieved due to the inherent function of the device to return a reflected signal in precisely the opposite direction from which an incoming signal was received.

Figures 3A, 3B:
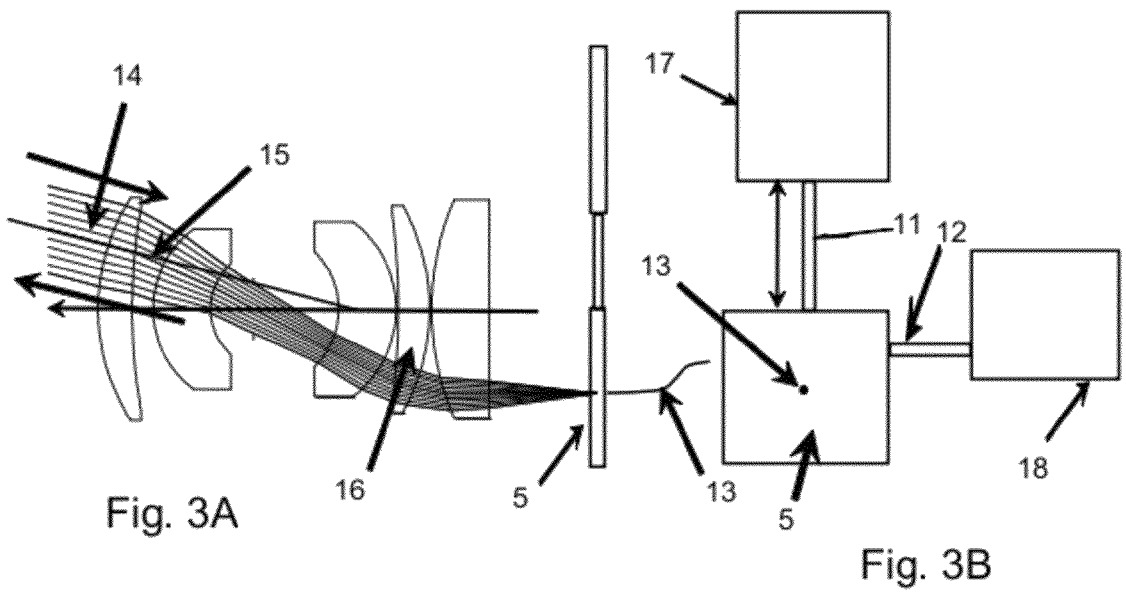
FIG. 3A is a diagram illustrating the operation of the preferred embodiment of the present invention after the final position of the optical fiber system is reached following the acquisition of the beam as shown in FIGS. 2A and 2B.
FIG. 3B is a diagram illustrating in rear elevational view the preferred embodiment of the present invention in the same configuration as shown in FIG. 3A.

FIGS. 3A and 3B illustrate a second configuration for the preferred embodiment of the present invention, with different focal plane positions representing the movement of optic fiber 13 and mirror 5 that is made in response to receiving the incoming signal 14 as shown in FIGS. 2A and 2B. Y-axis translation motor 17 activates Y-axis translator assembly 11, and X-axis translation motor 18 activates X-axis translator assembly 12, in order to move the distal end of optical fiber 13 to the position within the focal plane identified previously as Y=N and X=M. Thus optical fiber 13 is moved to the maximum position at which incoming signal 14 has been identified as arriving on the focal plane of telescope 1, thereby transmitting its outgoing signal to the location of the receiving transmitter. For this reason, it may be seen that optical fiber 13 is preferably coiled, so that sufficient slack exists for optical fiber 13 to be laterally moved across the field of view (FOV) of the receiver. The transmitter optical fiber, preferably being the same as that of the receiver of the preferred embodiment, automatically reflects a beam back in the direction of the transmitter, just as was explained above with respect to the initial receiver. In this manner, a communications link is established. While in this example only movement in the Y-direction is shown, it may be understood that the system may operate to provide a communications link when the focus spot of received beam 14 lies anywhere along the plane of mirror 5.

A control system may be implemented to manipulate the translation devices described herein, in accordance with the preferred embodiment of the present invention. The operation of the control loop is preferably based upon a maximization of the optical power collected by the receiver version of optical fiber, and thereby the transmitter of optical fiber, since the transmit and receive source are the same. Various such algorithms are known in the art. In the preferred embodiment, such a control system may be implemented in software using a microprocessor in communication with the transceiver system.

One of the most important advantages of the invention as described herein is the inherent ability to rapidly acquire a target terminal over a large pointing uncertainty area. This is possible because the invention is capable of providing a lock on to the target terminal the first time its optics is swept by the transmitting terminal, regardless of how it is moving its transmitted beam (i.e., the target terminal may be searching simultaneously). Due to the design of the optics, a mirrored focal plane, as shown in the preferred embodiment as mirror 5, will return the incident beam in exactly the same trajectory as it had incoming, regardless of where it is focused in the focal plane. Thus the transmitting terminal will see its own back reflection when it sweeps the target terminal. The transmitting terminal then simply locks on to its own back reflection and waits for the target terminal to do the same, at which time the link will be established. This operation does not require a more powerful laser or separate optics for the search beacon as opposed to the communications system. Because the mirror is in the focal plane of the receiver optics, it reflects all the incident light on the optics back through the optics, which re-collimates the back-reflected beam as well as sending it back along the incoming path. This means, for example, that for a typical optical antenna efficiency of 66%, fully 44% of the intensity will make it back to the transmitting terminal. In practical applications, it is believed that the level of optical intensity needed for detection will always be lower than 44% of the intensity needed for high data rate communications, so the communications system is always sufficient for the acquisition process. Furthermore, the rapid acquisition technology embodied in the present invention is completely passive and does not add significant cost, power consumption, or size/mass to the system.

The present invention has been described with reference to certain preferred embodiments, which are intended to be exemplary only and not limiting to the full scope of the present invention as set forth in the appended claims.

What is claimed is:

1. An optical communication apparatus, comprising:
   (a) an optical fiber comprising a first and second end;
   (b) at least one of an optical signal receiver and an optical signal transmitter in communication with said first end of said optical fiber;
   (c) a mirror lying in a focal plane of the apparatus, wherein said mirror comprises an opening to receive said second end of said optical fiber; and
   (d) a translation device in communication with said optical fiber and said mirror, wherein said translation device is operable to move said mirror and said second end of said optical fiber within the focal plane of the apparatus.

2. The apparatus of claim 1, wherein said translation device comprises a plurality of actuators.

3. The apparatus of claim 2, wherein each of said plurality of actuators comprises:
   (a) a translation motor;
   (b) an arm connected to said translation motor; and
   (c) a linkage connecting said arm to said mirror.

4. The apparatus of claim 3, further comprising a mirror and optical fiber support annularly connected to said optic fiber and pivotally in communication with each of said linkages.

5. apparatus of claim 1, wherein said mirror is substantially flat.

6. The apparatus of claim 2, further comprising an optical telescope opposite said second end of said optical fiber.

7. The apparatus of claim 6, wherein said optical telescope comprises a plurality of lenses, said plurality of lenses operable to focus an incoming signal received by said optical telescope to a location on said mirror within the focal plane of the apparatus.

8. The apparatus of claim 7, wherein said plurality of actuators are operable to move said second end of said optical fiber to the location on the focal plane where the incoming signal is maximized by said plurality of lenses.

9. A method of communicating with optical signals transmitted between first and second optical devices, wherein the second optical device comprises an optical fiber comprising a first and second end with an optical signal receiver and an optical receiver transmitter in communication with said first end of said optical fiber, and a mirror within a focal plane of the second optical device, wherein said mirror comprises an opening to receive said second end of said optical fiber, said method comprising the steps of:
   (a) sending a first optical signal from the first optical device to the second optical device;

(b) receiving the first optical signal on the mirror of the second optical device;
(c) reflecting the first optical signal from the mirror of the second optical device back to the first optical device; and
(d) deflecting an end of the optical fiber of the second optical device to lie at a maximum intensity point of the first optical signal received on the mirror at the focal plane of the second optical device by means of a translation device operable to move said mirror and said second end of said optical fiber within the focal plane of the second optical device.

10. The method of claim 9, further comprising the step of sending a second optical signal from the optical fiber of the second optical device to the first optical device.

11. The method of claim 10, wherein the first optical device comprises an optical fiber and a mirror within a focal plane of the first optical device, further comprising the steps of:
   (a) receiving the second optical signal on the mirror of the first optical device; and
   (b) deflecting an end of the optical fiber of the first optical device to lie at a maximum intensity point of the second optical signal received on the mirror at the focal plane of the first optical device.

12. The method of claim 11, further comprising the step of sending a third optical signal from the optical fiber of the first optical device to the second optical device.

* * * * *

UNITED STATES PATENT AND TRADEMARK OFFICE
CERTIFICATE OF CORRECTION

PATENT NO. : 8,160,452 B1
APPLICATION NO. : 12/349570
DATED : April 17, 2012
INVENTOR(S) : Terry L. Tidwell et al.

It is certified that error appears in the above-identified patent and that said Letters Patent is hereby corrected as shown below:

In the Specification

In Column 1, lines 8-12, delete "The U.S. Government has a paid-up license in this invention and the right in limited circumstances to require the patent owner to license others on reasonable terms as provided for by the terms of contract no. F29601-02-C-0021 awarded to the United States Air Force Research Laboratory." and insert --This invention was made with Government support under contract F29601-02-C-0021 and FA9453-12-M-0354 awarded by the United States Air Force. The Government has certain rights in this invention.--, therefor.

Signed and Sealed this
Twenty-seventh Day of October, 2015

Michelle K. Lee
*Director of the United States Patent and Trademark Office*